May 15, 1962     K. HEHL     3,034,175
INJECTION MOLDING APPARATUS
Filed March 14, 1960     6 Sheets-Sheet 1
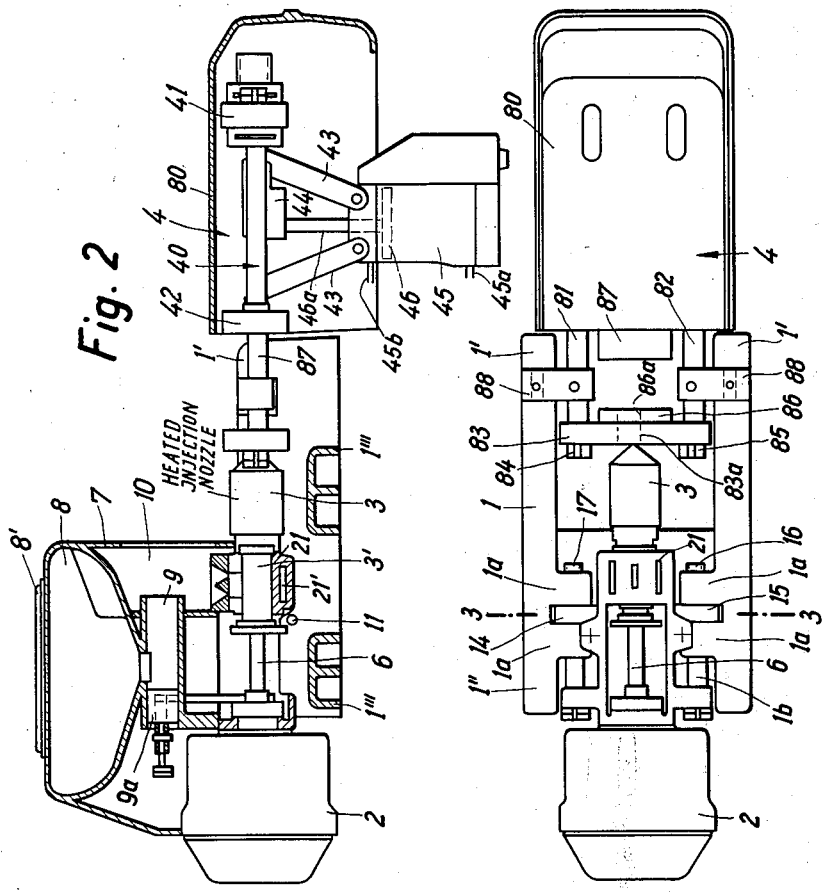
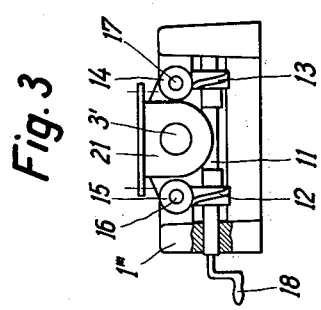
Inventor:
Karl Hehl
by George K. Spencer
Attorney May 15, 1962 K. HEHL 3,034,175
INJECTION MOLDING APPARATUS
Filed March 14, 1960 6 Sheets—Sheet 2

Inventor:
Karl Hehl
by George K. Spencer
Attorney

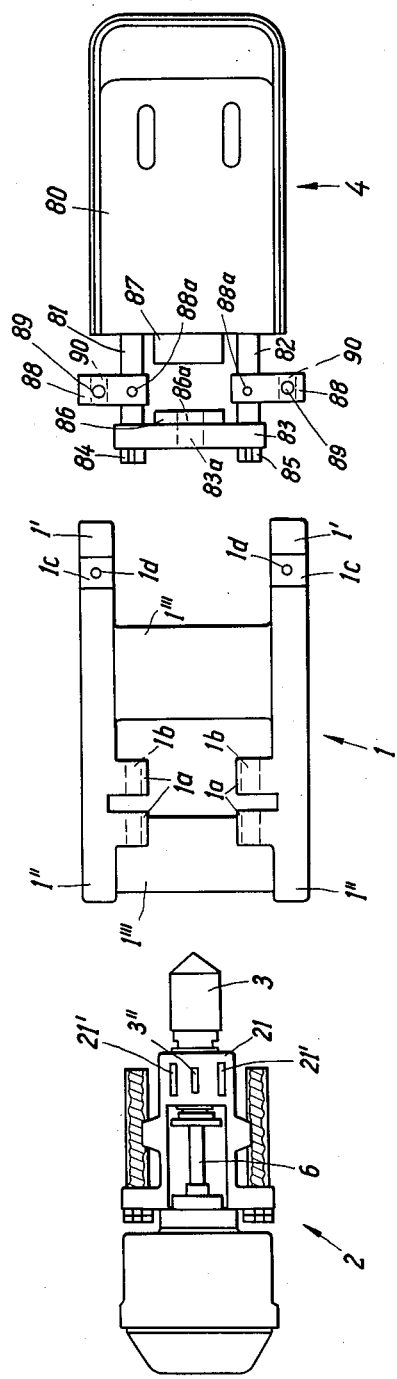

May 15, 1962 K. HEHL 3,034,175
INJECTION MOLDING APPARATUS
Filed March 14, 1960 6 Sheets-Sheet 4
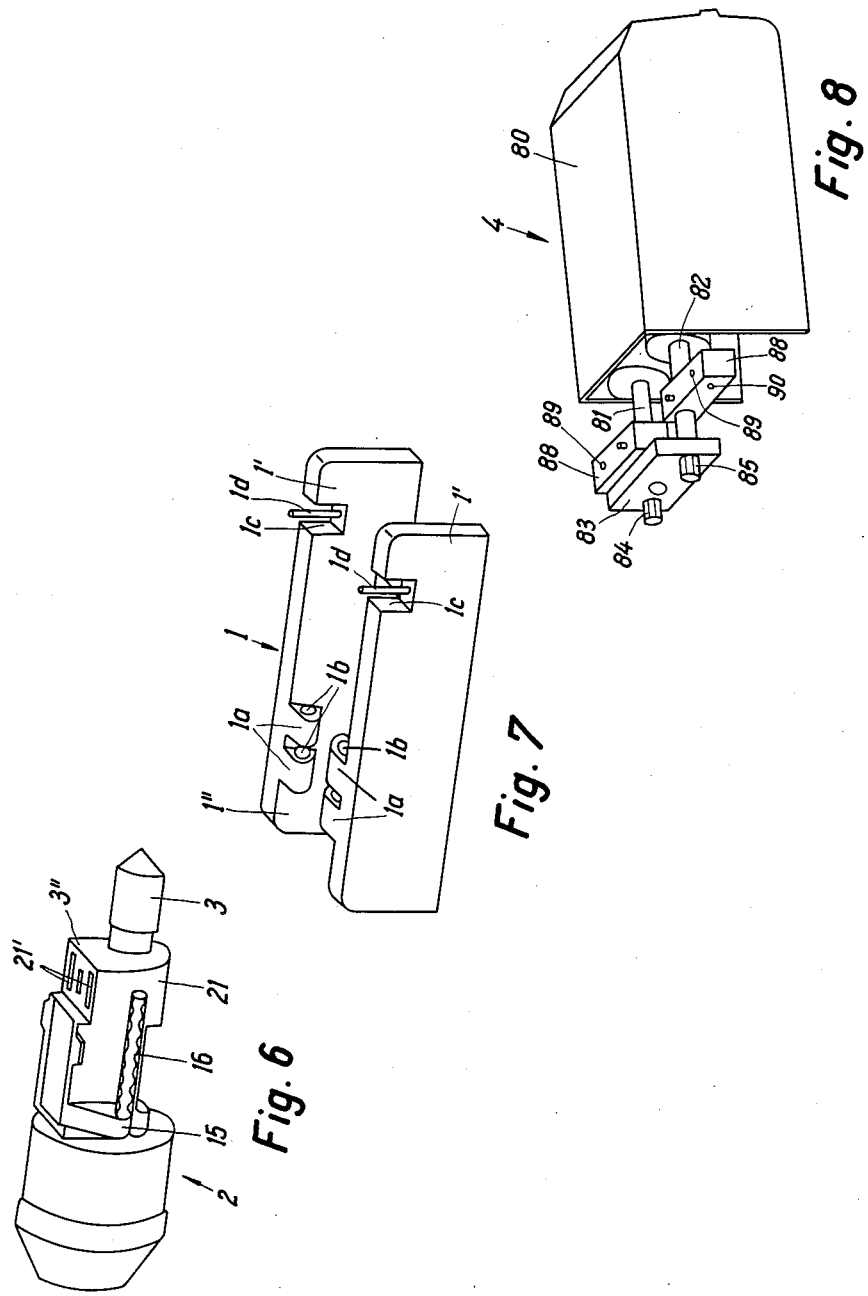

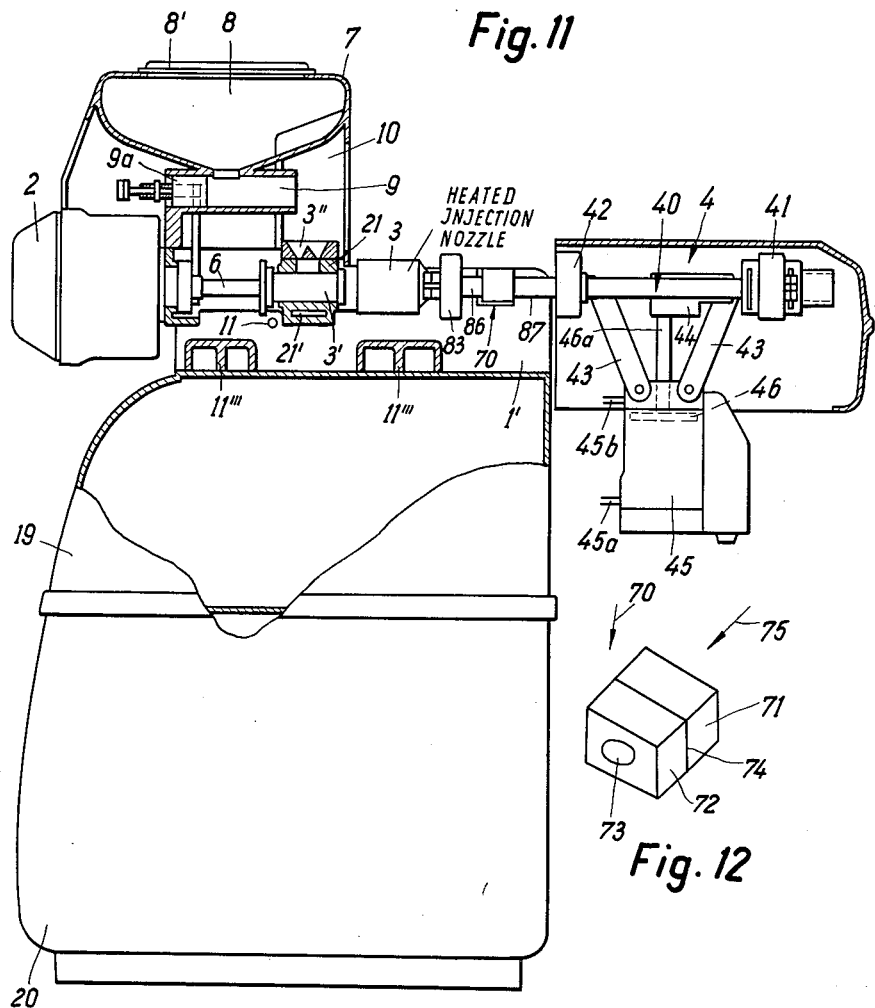

United States Patent Office 3,034,175
Patented May 15, 1962

3,034,175
INJECTION MOLDING APPARATUS
Karl Hehl, Lossburg, Wurttemberg, Germany, assignor to Arburg-Feingeratefabrik o.H.G., Hehl & Söhne, Lossburg, Wurttemberg, Germany
Filed Mar. 14, 1960, Ser. No. 14,946
Claims priority, application Germany Aug. 22, 1959
4 Claims. (Cl. 18—30)

The present invention relates to an injection molding apparatus.

More particularly, the present invention relates to an injection molding apparatus which is equipped with adjustable clamping means that accommodate different types of molds.

It is an object of the present invention to provide an injection molding apparatus which assures a linear flux being delivered to the mold.

It is another object of the present invention to provide an injection molding apparatus which will accurately inject a molding material even under operating conditions where very substantial pressures are exerted on the mold by the material being injected.

The objects of the present invention also include the provision of an injection molding apparatus which is of rugged construction and which will give long periods of trouble-free service.

With the above objects in view, the present invention resides mainly in an injection molding apparatus which comprises a support, injection means arranged on the support and having an injection nozzle for injecting material in a horizontal direction, and clamping means arranged on the support and movable relative thereto between two clamping positions in one of which the clamping force acts in the same horizontal direction as that in which the injection nozzle injects material and in the other of which clamping positions the clamping force acts in a direction perpendicular to that in which the injection nozzle injects material.

Additional objects and advantages of the present invention will become apparent upon consideration of the accompanying drawings in which:

FIGURE 1 is a plan view of an injection molding apparatus according to the present invention.

FIGURE 2 is a side elevational view, partly in section, of the apparatus shown in FIGURE 1.

FIGURE 3 is a sectional view taken substantially along line 3—3 of FIGURE 2.

FIGURE 5 is an exploded view showing, in plan view, as separate entities the parts illustrated in FIGURE 1, namely, the injection means, the support, and the clamping means.

FIGURE 6 is a perspective view of the injection means, with some of the parts thereof removed.

FIGURE 7 is a perspective view of the upper part of the support.

FIGURE 8 is a perspective view of the clamping means.

FIGURE 11 is a side elevational view, partly in section, of the molding apparatus with the clamping means being in a position wherein the clamping force acts in the same direction as that in which the nozzle injects material.

FIGURE 12 is a perspective view of a mold held by the clamping means while the same is in the position illustrated in FIGURE 11.

Figure 4:
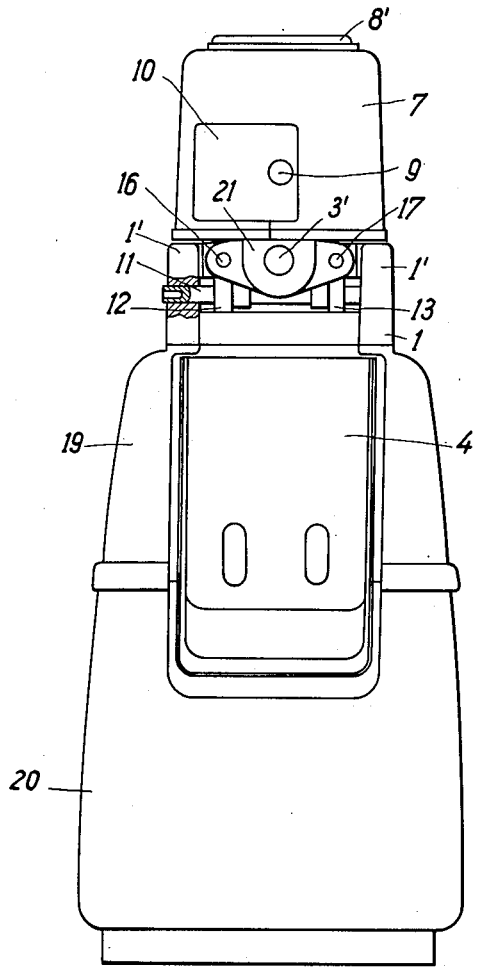
FIGURE 4 is a front view of the apparatus, taken partly in section also along line 3—3 of FIGURE 2.

Referring now to the drawings, there is shown an injection molding apparatus comprising a base support 1, an injection means 2 having an injection nozzle 3 mounted on the support, and a clamping means 4 which is likewise mounted on the support.

The upper part of support 1 has the shape of a U and consists of two legs which extend throughout the entire length of the U. The free ends of the legs are indicated at 1' whereas the base ends are indicated at 1". The two legs are joined to each other by two transverse connecting strips 1''', the two strips 1''' and the base end portions 1' of the legs thus forming the base of the U. Furthermore, the base ends of the legs are formed with inwardly directed ears 1a having aligned bores 1b, whereas the free ends are formed with cutouts 1c within which there are upstanding pins 1d.

The lower part of the support (FIGURES 4, 9 and 11) is made of upper and lower housing portions 19 and 20 containing, respectively, the electrical, pneumatic and hydraulic control means for the apparatus (not shown) as well as a coolant pump for cirulating a cooling liquid (not shown).

The injection means 2 comprise a main carrier element 21 to which the injection nozzle 3 is attached. This nozzle, which is heated in conventional manner for plasticizing the material to be injected, is so arranged that the material, when acted on by a power-driven plunger 6, flows out in a horizontal direction. The carrier element further carries material supply means which include a supply conduit 3' communicating with the nozzle 3. This conduit is surrounded by a channel 21' through which a coolant is circulated, the pump for effecting the circulation being arranged in the lower housing part 20, as stated above, with suitable tubing (not shown) being provided for placing the channel 21' in communication with the pump.

The supply conduit 3' is formed at its top with an inlet opening 3'' through which material passing out of a dosing cylinder 9 may drop into the conduit 3'. This dosing cylinder is arranged beneath a receptacle 8 which holds material to be fed to the nozzle, so that a piston 9a may move a predetermined quantity of material rightwardly, as viewed in the drawings, and into the supply conduit 3' by way of the inlet opening 3''. The piston 9a may be actuated in any suitable manner, and its movement is coordinated with the injection molding operation of the apparatus as a whole.

The dosing cylinder 9 and receptacle 8 are joined together to form a single unit which constitutes a removable upper part 7 of the injection means. In this way, the unit may be exchanged for another very easily, thereby facilitating the exchange of material to be fed to the nozzle 3. Also, a unit substituted for the one shown in the drawings may incorporate a volumetric or weight dosing arrangement differing from the illustrated plunger-type mechanism.

As is clearly shown in the drawings, the material supply means which communicate with the nozzle 3 are arranged laterally thereof, so that heat rising upwardly from the nozzle does not heat material being supplied to the nozzle. Consequently, the material will retain its granular solid condition without being plasticized until its reaches the nozzle in which the plasicizing is to take place, so that no feed problems will be encountered.

The entire injection means are mounted on the support 1 for movement relative thereto in the same horizontal direction in which the injection nozzle 3 injects material. This is acocmplished by two elongated slide rods 16, 17 on the carrier element 21, these slide rods being received by guide means on the support 1, namely, the aligned bores 1b of the inwardly directed ears 1a. These slide rods are threaded and are in engagement with internally threaded worm wheels 14, 15 located between the ears 1a on the same side of the U. These worm wheels are in mesh with worms 12, 13 carried on a transverse rotatable shaft 11 which may be turned by a hand crank 18. It will be understood that with axial movement of the worm wheels 16, 17 being prevented by the ears 1a, the carrier element 21 may be moved to and fro by turning the hand crank 18.

In place of the above-described worm and worm wheel arrangement, any other suitable moving mechanism, such as a rack and pinion drive (not shown), may be provided for moving the carrier element 21 in the horizontal direction in which it is movable.

Figures 9, 10:
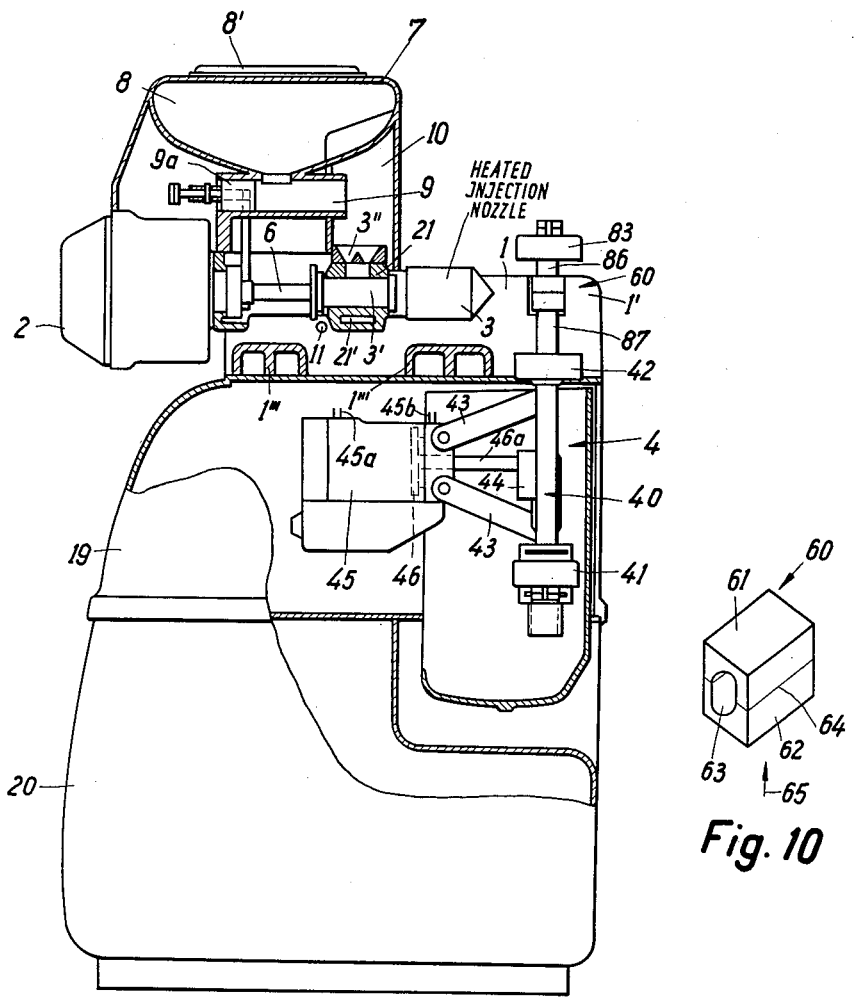
FIGURE 9 is a side elevational view, partly in section, of the molding apparatus with the clamping means being in a position wherein the clamping means exert a clamping force that acts in a direction perpendicular to that in which the injection nozzle injects material.
FIGURE 10 is a perspective view of a mold held by the clamping means while the same is in the position illustrated in FIGURE 9.

Turning now to the clamping means indicated generally at 4, the same are adapted to be mounted on the support 1 in either one of two positions as is best explained with reference to FIGURES 9 and 10 and FIGURES 11 and 12. In FIGURE 9, the clamping means 4 hold in a place a mold 60, shown individually in FIGURE 10. This mold 60 is made up of two mold members 61 and 62 which have complementary faces so that when these two mold members are clamped together in face-to-face relationship, they constitute the complete mold 60. It will be noted that the inlet opening or ingate 63 of the mold is so arranged as to straddle the juncture or parting plane 64 of the two mold members, so that when the mold 60 is so placed that its ingate 63 is in alignment with the injection nozzle 3, this juncture 64 will be in a plane generally parallel to the direction in which the injection nozzle injects material. Therefore, the clamping means which hold the two molder members 61, 62 together must exert a force that acts in a direction 65 that is substantially perpendicular to the horizontal direction in which the injection nozzle injects material.

While a mold having its ingate straddling the parting plane is desirable for molding certain types of articles, it has been found that other articles are best molded in molds whose ingate is formed in only one of the two mold members. Such a mold is shown in FIGURE 12 wherein the mold 70 is composed of mold members 71 and 72, it being the latter that is formed with the ingate 73 that must be placed in alignment with the injection nozzle 3. Thus, the mold 70 will be in a position wherein the parting plane 74 is transverse to the direction in which the nozzle 3 injects material, so that the clamping means must exert a clamping force that acts in a direction 75 that is coincident with that in which the nozzle injects material. FIGURE 11 shows the clamping means as occupying the appropriate position.

The clamping means comprise a housing 80 through the front of which project two attaching rods 81 and 82. Their free ends are joined by a cross-piece 83 held in place by nuts 85 and 86. The cross-piece 83 carries a platen 86 (FIGURE 5) and it is between this platen and a movable clamping ram 87 that either of the mold members 60 and 70 is held. The cross-piece 83 and platen 86 are formed with aligned bores 83a and 86a, respectively, and these bores are in alignment with the ingate 73 of the mold 70 when this particular mold is held by the clamping means.

The rods 81 and 82 each carry a mounting block 88 formed with a bore through which the corresponding rod passes. In order to allow each mounting block to be held in place anywhere along the length of the rod, there is provided a set screw 88a which, when tightened, prevents movement of the block relative to the rod. However, upon loosening of the set screw, the block may be moved along the length of the rod to any desired position.

Each block 88 is formed with two intersecting bores 89, 90. These bores are at right angles to each other and lie in parallel planes which are spaced apart a distance equal to that which the two pins 1d are spaced apart. The bores are of sufficient diameter to receive the pins 1d.

It will readily be understood that the clamping means 4 may thus be mounted to the support 1 in either one of the following two positions: (1) a position in which the pins 1d pass through the bores 89, whereupon the clamping means will be oriented as shown in FIGURE 11 (as well as in FIGURES 2 and 3), and (2) a position in which the pins 1d pass through the bores 90, whereupon the clamping means will be oriented as shown in FIGURE 9. In either position, the blocks 88 and consequently the entire clamping means 4 are held in place by nuts (not shown) threaded on the free ends of the pins 1d.

The mechanism for moving the clamping ram 87 relative to the stationary platen 86 may be similar to the nozzle lever clamping mechanism disclosed in co-pending application Ser. No. 818,337, filed June 5, 1959, now Patent No. 3,015,131, and entitled "Clamping Mechanism for Molding Press." This mechanism, indicated generally at 40, comprises a lever linkage system interposed between a stationary abutment 41 and a thrust plate 42 connected to the ram 87. The lever linkage system incorporates the pivotally mounted links 43, 44, the former being connected to a cylinder 45 and the latter to a position rod 46a of a piston 46 slidably arranged within the cylinder 45, the arrangement of the parts being such that when a pressure fluid medium is introduced into the interior of the cylinder 45 through the port 45a, the piston 46 may be moved into and held in a position wherein the mold 60 or 70 is held in place, whereas when fluid is introduced through the port, 45b, the mold is released. The hydraulic connections to the ports 45a, 45b, are of conventional arrangement and are not illustrated.

It will be seen from the above that according to the present invention, either of the two mold types shown in FIGURES 10 and 12 may be held in place; the same clamping means being usable to exert the clamping force in the appropriate direction so that the injection nozzle 3, which delivers material in a horizontal direction, will be in perfect alignment with the ingate of the mold, thereby assuring a rectilinear flow of material into the mold. Moreover, the arrangement of the parts is such that the injection nozzle 3 is carried by an element which itself is mounted on the support in such a manner that the horizontal orientation of the nozzle 3, and consequently the linearity of the flux, is maintained even under operating conditions where very substantial pressure are exerted on the mold by the material being injected. At the same time, the construction is rugged, and the apparatus will give long periods of trouble-free service.

It will be apparent that the present invention is susceptible to various modifications and adaptations, and the same are intended to be included within the scope of the appended claims.

I claim:

1. In an injection molding machine, the combination which comprises: a U-shaped base support having two horizontal legs extending throughout the length of the U and transverse connecting strip means connecting said legs and forming the base of the U; injection means including a plasticizing nozzle, a plunger for moving plastic material out of said nozzle, an upper part containing a supply receptacle and a dosing device for feeding dosed quantities of material from said receptacle to said nozzle, and a carrier element carrying the component parts of said injection means, said carrier element being concentric with and surrounding said plasticizing nozzle, said carrier element being arranged between said legs of said support such that the axis of said nozzle is parallel to said legs; first mounting means securing said injection means to said legs of said support, said first mounting means being adjustable to allow the axial position of said injection means to be varied along said support; mold clamping means having elongated attaching rods; and second mounting means in symmetry with respect to said axis of said plasticizing nozzle for mounting free end portions of said attaching rods to said legs, respectively, so as to position said clamping means between said legs of said support in either a horizontal or a vertical position, as desired, such that a mold clamped by said clamping means is in alignment with said axis of said plasticizing nozzle, said second mounting means enabling the position of said attaching rods of said clamping means to be varied relative to said legs, in a direction parallel to said nozzle axis, when said clamping means are in said horizontal or vertical position thereof, whereby said injection means and said mold clamping means cooperate with each other to allow material to be moved by said plunger from said nozzle into a mold clamped by said clamping means without causing bending moments in said support.

2. The combination defined in claim 1 wherein said mounting means comprise pin-and-bore type connectors.

3. The combination defined in claim 1 wherein said first mounting means comprise two elongated slide rods received within aligned bores through inwardly directed spaced ears of said support, said slide rods being threaded and in engagement with internally threaded worm wheels located between ears on the same side of the U, said worm wheels being in mesh with worms carried on a transversely rotatable shaft, whereby upon rotation of said shaft, said injection means may be moved to and fro.

4. In an injection molding machine, the combination which comprises: a support having spaced coextensive leg portions; injection means having a plasticizing nozzle arranged between said leg portions of said support and mounted such that the axis of said nozzle is between and parallel to said leg portions, the position of said injection means being adjustable relative to said support in the direction of said axis; and mold clamping means adjustably mountable on said support either in a position in which the clamping force is coextensive with said axis or in a position in which the clamping force is at right angles to said axis, as desired, said clamping means being attached to said leg portions such that the attachment is symmetrical with respect to said axis, whereby the force with which plastic material is forced out of said nozzle and into a mold clamped by said clamping means will, irrespective of the position of said clamping means, produce no bending moments in said support.

References Cited in the file of this patent

UNITED STATES PATENTS

| | | |
|---|---|---|
| 2,438,856 | Knowles | Mar. 30, 1948 |
| 2,479,433 | Tucker | Aug. 16, 1949 |